US008565451B2

(12) United States Patent
Kano et al.

(10) Patent No.: US 8,565,451 B2
(45) Date of Patent: Oct. 22, 2013

(54) AUDIO SIGNAL OUTPUT DEVICE

(75) Inventors: Masaya Kano, Hamamatsu (JP); Hironari Kawai, Hamamatsu (JP); Tatsuya Takahashi, Hamamatsu (JP); Daigo Sugiura, Hamamatsu (JP); Hideyuki Suzuki, Hamamatsu (JP); Kunihiro Kumagai, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 836 days.

(21) Appl. No.: 12/221,741

(22) Filed: Aug. 6, 2008

(65) Prior Publication Data

US 2009/0060227 A1 Mar. 5, 2009

(30) Foreign Application Priority Data

Aug. 6, 2007 (JP) ................................ 2007-204615

(51) Int. Cl.
*H04R 5/00* (2006.01)
*H04B 1/06* (2006.01)

(52) U.S. Cl.
USPC .......................................... 381/123; 381/119

(58) Field of Classification Search
USPC ............... 381/119, 123, 1–28, 104–109, 120, 381/300–311, 56–59, 73.1, 74–85, 332–336
See application file for complete search history.

(56) References Cited

U.S. PATENT DOCUMENTS 6,681,018 B1 * 1/2004 Asakura et al. ................. 381/18
6,826,283 B1 * 11/2004 Wheeler et al. ................. 381/77
6,867,820 B2 * 3/2005 Jin ................................ 348/738
7,006,645 B2 2/2006 Fujita et al.
7,206,648 B2 * 4/2007 Fujishita ......................... 700/94
7,792,311 B1 * 9/2010 Holmgren et al. .............. 381/61
8,270,631 B2 * 9/2012 Kusunoki ........................ 381/85
2003/0144848 A1 * 7/2003 Roy et al. ...................... 704/500
2004/0062402 A1 * 4/2004 Fujita et al. .................... 381/18
2004/0117044 A1 * 6/2004 Konetski ......................... 700/94
2005/0111672 A1 * 5/2005 Chen .............................. 381/81

FOREIGN PATENT DOCUMENTS

JP 2002-142278 5/2002
JP A-2004-039085 2/2004
JP A-2004-112762 4/2004
JP A-2006-287574 10/2006

OTHER PUBLICATIONS

Japanese Patent Office, "Notice of Reasons for Rejection" Patent Application No. P2007-204615 of Yamaha Corporation; Mailing Date: Jun. 5, 2012; 5 pages.
Japanese Patent Office, "Notice of Reasons for Rejection" Patent Application No. 2007-204615 of Yamaha Corporation; Mailing Date: Mar. 26, 2013; 6 pages.

* cited by examiner

*Primary Examiner* — Steven J Fulk
*Assistant Examiner* — Eric Ward
(74) *Attorney, Agent, or Firm* — Pillsbury Winthrop Shaw Pittman LLP

(57) ABSTRACT

Under the control of a controller, a DSP supplies audio signals received from a switch circuit to a main zone DAC, subjects the audio signals received from the aforementioned switch circuit (i.e., audio signals for main zone use) to down-mixing processing so that the number of channels matches the number of output terminals assigned to each zone, and respectively supplies the audio signals subjected to down-mixing processing to the respective switch circuits of each zone. Each of the aforementioned switch circuits supplies the audio signals received from the subzone DAC to the respective volume adjustor of each zone.

9 Claims, 4 Drawing Sheets

FIG. 4

| ZONE ID | ZONE NAME | INPUT SOURCE | SOUND VOLUME | TONE CONTROL SETTING | ACOUSTIC SETTING | OUTPUT TERMINAL | ZONE ON/OFF STATE |
|---|---|---|---|---|---|---|---|
| MAIN ZONE | LIVING ROOM | DVD | ••• | ••• | ••• | ••• | ON |
| ZONE 2 | KITCHEN | CD | ••• | ••• | ••• | ••• | OFF |
| ZONE 3 | ROOM A | MD | ••• | ••• | ••• | ••• | ON |
| ZONE 4 | PATIO | FM | ••• | ••• | ••• | ••• | ON |

AUDIO SIGNAL OUTPUT DEVICE

BACKGROUND OF THE INVENTION

1. Field of the Invention

The present invention relates to a technology for outputting audio signals.

Priority is claimed on Japanese Patent Application No. 2007-204615 filed on Aug. 6, 2007, the content of which is incorporated herein by reference.

2. Description of the Related Art

AV (audio/visual) devices such as AV amps and AV receivers connect various types of playback equipments and recording/playback devices such as the DVD (Digital Versatile Disk) player and CD (Compact Disc) player, and are capable of playing back or reproducing numerous media such as DVD-Video, CD, DVD-Audio, SACD (Super Audio CD), and Video-CD. With respect to such AV devices, Japanese Unexamined Patent Application, First Publication No. 2002-142278 offers an equipment control method wherein functions or parameters which have been preset by the user are accessed by a single key stroke. According to this method, it is possible to store various settings in the AV device such as input switching operated by remote controller, surround mode switching, adjusted frequency properties by using a graphic equalizer, and volume adjustment of electronic volume, and it is possible to read the stored contents when a predetermined operation is conducted by pressing keys and to set the respective parameters to read contents.

In recent years, with respect to AV devices provided with surround functions by multiple channels such as 5.1 ch or 11.2 ch, devices which output individual sources in multiple zones (rooms) have been proposed. According to such devices, for example, a 9.1 ch surround can be used if a theater room alone is employed, while a 5.1 ch+2 ch+2ch configuration can be used in the case of, for example, a living room and two study rooms.

When the aforementioned AV device provided with surround functions by multiple channels is used, one may desire to output the same source in multiple zones where speakers have been installed. In such cases, with conventional devices, it is necessary to conduct selection and setting of the input source in each zone, and such work is complex.

SUMMARY OF THE INVENTION

The present invention was made in light of the foregoing circumstances. With respect to devices provided with surround functions by multiple channels, an object of the present invention is to provide a technology enabling output of the same source to multiple zones by a simple operation. In order to achieve the object, the present invention has, for example, the following aspects.

A first aspect is an audio signal output apparatus which includes: a signal processing unit which conducts a predetermined operation on input signals, and which outputs output signals of N channels; a plurality of output terminals for a main zone which respectively input the output signals of N channels output from said signal processing unit; a mixing unit which generates output signals of M channels (M<N) by down-mixing the output signals of N channels processed by said signal processing unit; a selection unit which selects and outputs either among output signals of M channels output from said mixing unit or other input signals; output terminals for subzones which input the output signals from said selection unit; and a control unit which controls said selection unit to select output signals of said mixing unit when inputting predetermined command signals.

A second aspect is an audio signal output apparatus which includes a signal processing unit which conducts a predetermined operation on input signals, and which outputs output signals of N channels; a main zone amp which amplifies the output signals output from said signal processing unit; a mixing unit which down-mixes the output signals of N channels output from said signal processing unit to M channels (M<N); a selection unit which selects and outputs either among output signals of said mixing unit or other input signals; a subzone amp which amplifies the output signals of said selection unit; and a control unit which causes said selection unit to select output signals of said mixing unit when inputting predetermined command signals.

A third aspect is preferably an audio signal output apparatus of the first or second aspect, wherein said selection unit is preferably plural and integrally controlled by said control unit.

A fourth aspect is preferably an audio signal output apparatus of one of the first to third aspects, preferably further including a source selection unit which selects one signal among a plurality of signals output from a plurality of sources and determines the selected signal as the input signal of said signal processing unit.

A fifth aspect is preferably an audio signal output apparatus of one of the first to fourth aspects, preferably further comprising a second source selection unit which selects one signal among a plurality of signals output from a plurality of sources and which determines the selected signal as the input signal of said mixing unit.

A sixth aspect is preferably an audio signal output apparatus of one of the first to fifth aspects, wherein the predetermined operation conducted by said signal processing unit preferably includes at least one of a sound field operation which appends sound field properties to the input signals and a decoding operation which decodes the input signals by applying a predetermined decoding method.

A seventh aspect is preferably an audio signal output apparatus of one of the first to sixth aspects, further including a post-signal processing unit which conducts a sound field operation that appends sound field properties to the output signals of said mixing unit wherein said selection unit selects and outputs either among the output signals of said post-signal processing unit or other input signals.

An eighth aspect is preferably an audio signal output apparatus of the first or second aspect, wherein said selection unit is plural, and the audio signal output apparatus further includes: a determination unit which determines whether or not the output signals to be output by each selection unit exist or not based on signals input from a manipulation unit; and a subzone output on/off control unit which conducts an on/off control of an outputting operation to subzones corresponding to each of said selection unit based on determination results of said determination unit.

A ninth aspect is preferably an audio signal output apparatus of the third aspect, further including a mode determination unit which determines whether or not a predetermined mode is selected with regard to each of said selection units, wherein said control unit controls the selection unit to select the output signals of said mixing unit when said mode determination unit determines that said predetermined mode is selected with regard to the selection unit, and said control unit controls the selection unit to select an output signal other than the output signals of said mixing unit when said mode determination unit does not determine that said predetermined mode is selected with regard to the selection unit.

According to the above-described aspects, with respect to a device provided with surround functions by multiple channels, it is possible to output an identical source to multiple zones by a simple operation.

BRIEF DESCRIPTION OF THE DRAWINGS

FIG. 4 is a figure which shows an example of zone setting data.

DETAILED DESCRIPTION OF THE INVENTION

An embodiment showing an example of the present invention is described below with reference to drawings.

A: Configuration

The present invention may be applied to various types of AV equipment such as AV amps and home theaters, but the embodiment herein described is applied to an AV receiver (AV amp with tuner).

Figure 1:
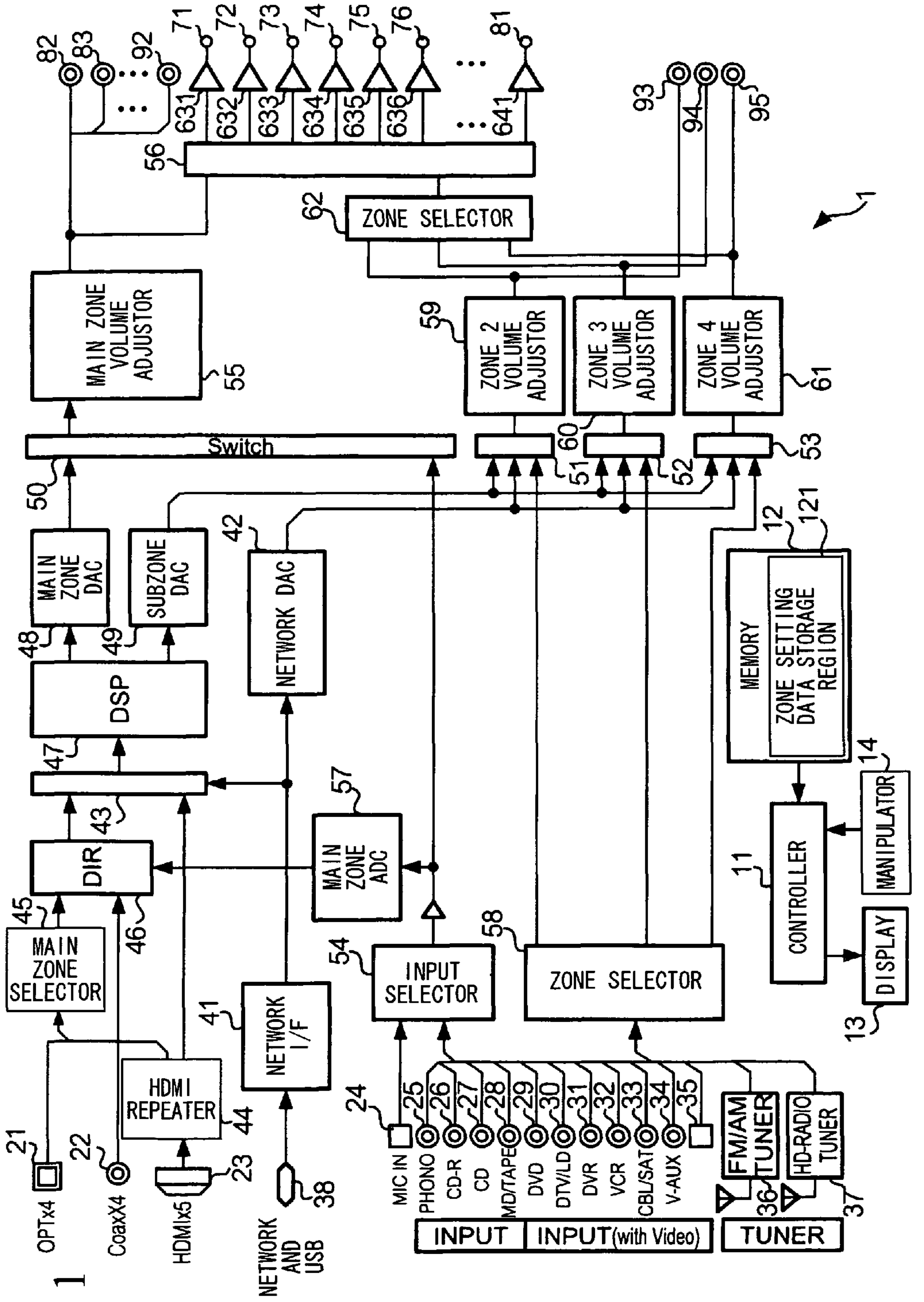
FIG. 1 is a block diagram which shows an example of the overall configuration of an AV receiver.

FIG. 1 is a block diagram which shows the overall configuration of an AV receiver 1 which is one embodiment. In the drawing, a control portion 11 is provided with a CPU (Central Processing Unit), ROM (Read Only Memory) and RAM (Random Access Memory), and controls the various parts of the AV receiver 1 by reading and executing a computer program stored in the ROM or memory portion 12. The memory portion 12 is a storage or memory means for storing the computer program executed by the control portion 11 and the data used when executing the computer program, and is, for example, an EEPROM (Electronically Erasable and Programmable ROM). A display portion 13 provides a display panel such as a LED panel or liquid crystal panel, and displays various types of images under the control of the control portion 11. An operation portion or manipulator 14 is provided with various keys such as a numeric keypad, and outputs signals to the control portion 11 according to manipulation by an operator of the AV receiver 1. In this embodiment, the case is described where the display portion 13 and operation portion 14 are contained in the AC receiver 1, but it is also acceptable to externally attach the display portion 13 and operation portion 14 to the AV receiver 1.

The AV receiver 1 is provided with the eleven output terminals of output terminal 71, 72, . . . 81, main zone pre-out terminals 82, 83, . . . 92, and subzone pre-out terminals 93, 94 and 95. Output terminals 71, 72, . . . 81 are respectively connected to speakers. By outputting audio signals to the respective speakers connected to output terminals 71, 72, . . . 81, music and sound expressed by audio signals are generated in the zones (rooms) where the speakers are installed.

Figure 2:
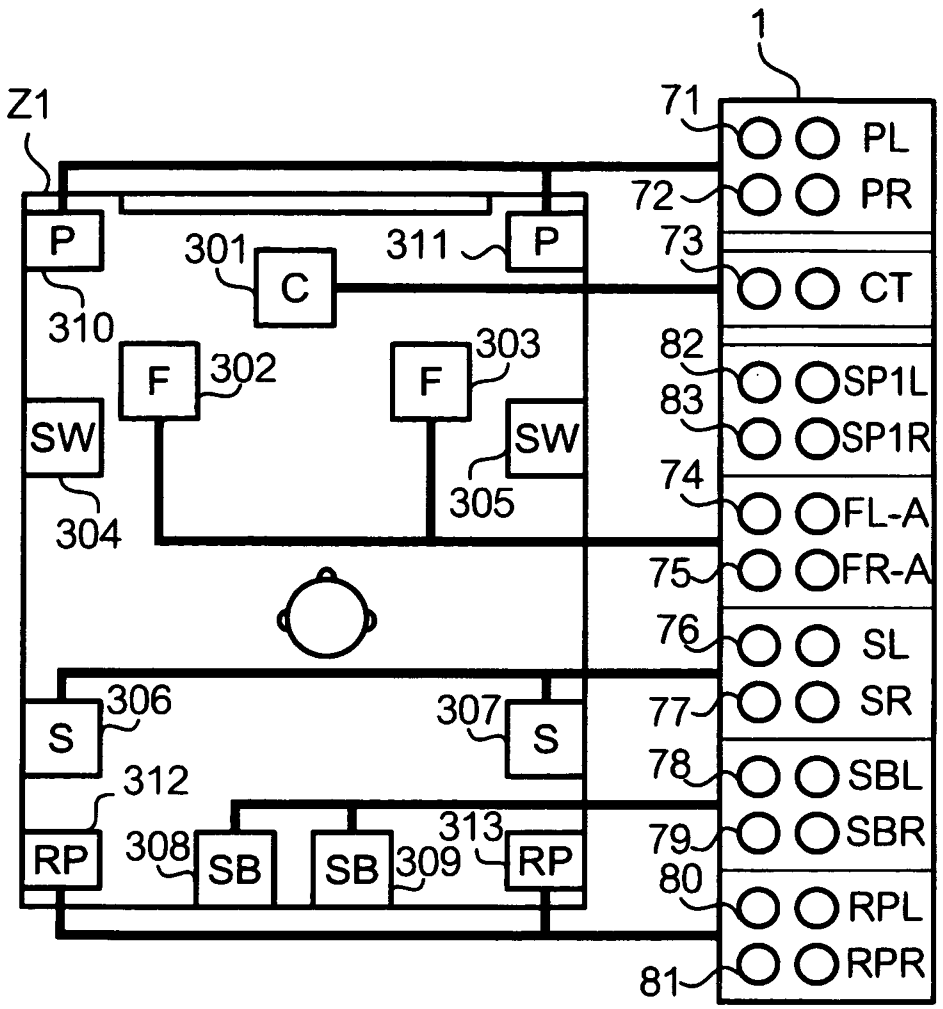
FIG. 2 is a figure which shows an example of a speaker layout mode in a main zone.
Figure 3:
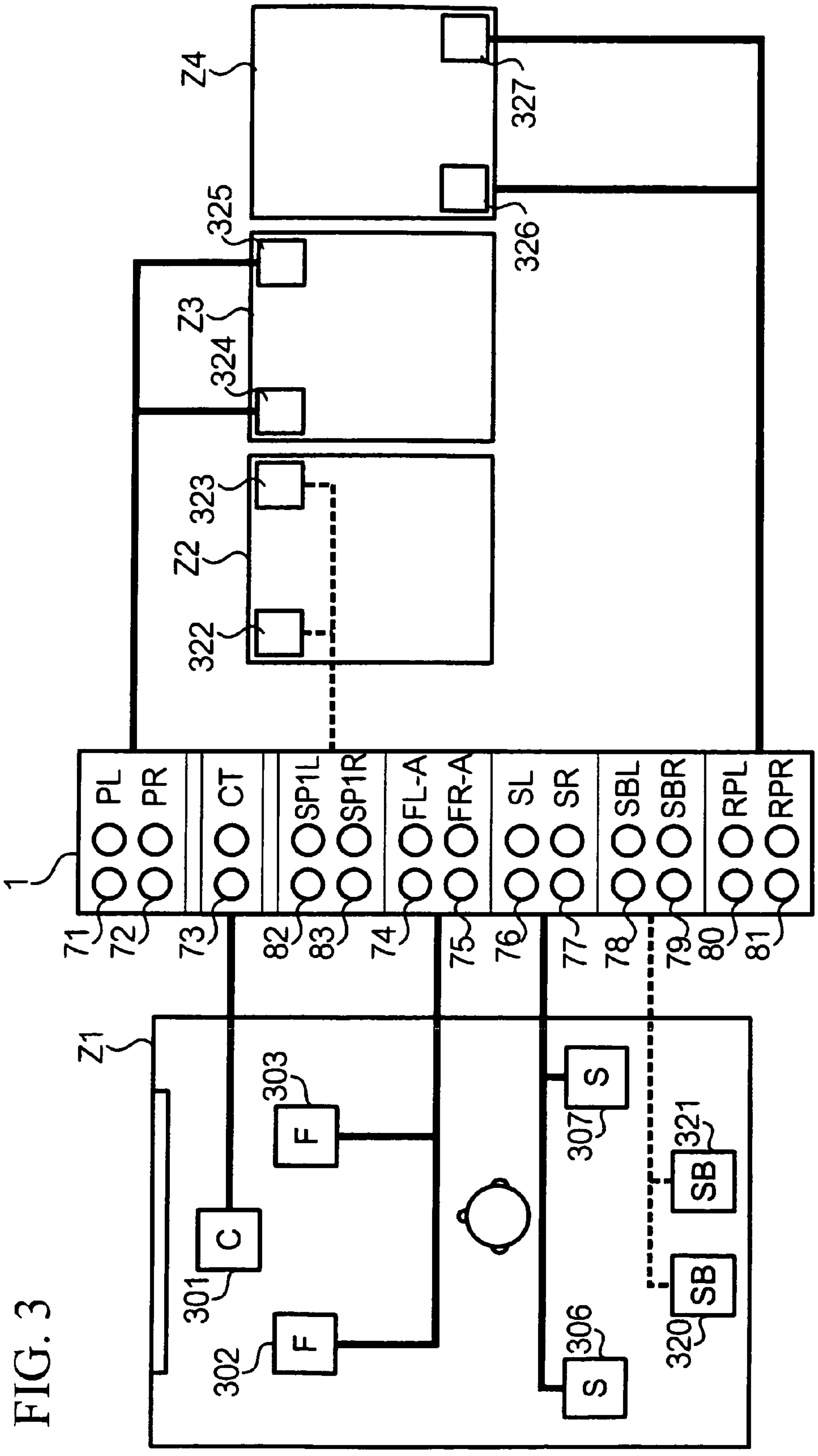
FIG. 3 is a figure which shows an example of a speaker layout mode in a main zone and subzones.

Here, the mode of use of the AV receiver 1 is described while referencing FIG. 2 and FIG. 3. FIG. 2 and FIG. 3 are figures which show examples of layout modes of speakers connected to the AV receiver 1. In FIG. 2, the main zone Z1 is the room where the user of the AV receiver 1 principally uses the AV receiver 1, for example, a living room. In total, 13 speakers are installed in this main zone Z1, including eleven speakers and two subwoofers, i.e., center speaker 301, front speaker (L) 302, front speaker (R) 303, subwoofer (L) 304, subwoofer (R) 305, surround speaker (L) 306, surround speaker (R) 307, surround back speaker (L) 308, surround back speaker (R) 309, presence speaker (L) 310, presence speaker (R) 311, rear presence speaker (L) 312, and rear presence speaker (R) 313.

For each audio signal channel, the AV receiver 1 outputs the audio signals of the channel to the output terminal corresponding to that channel. Each speaker installed in the main zone emits sound corresponding to the supplied audio signals to the respective channel, whereby surround-sound of 11.2 ch is achieved in the main zone Z1.

Next, in the example shown in FIG. 3, five speakers which are center speaker 301, front speaker (L) 302, front speaker (R) 303, surround speaker (L) 306 and surround speaker (R) 307, and two subwoofers 320 and 321 are installed in the main zone Z1. In addition, apart from the main zone Z1, the three zones (rooms) of zone Z2, zone, Z3 and zone Z4 are provided. In zone Z2, the two speakers of speaker 322 and speaker 323 are installed. In zone Z3, the two speakers of speaker 324 and speaker 325 are installed. In zone Z4, the two speakers of speaker 326 and speaker 327 are installed. The speakers installed in each zone Z2, Z3 and Z4 are connected to output terminals of the AV receiver 1. Using the AV receiver 1, the user of the AV receiver 1 is able to enjoy music and audio apart from the main zone Z1 in zone Z2, zone Z3 and zone Z4 respectively.

Returning to the description of FIG. 1, as shown in the drawing, the memory portion 12 has a zone setting data storage region 121. The zone setting data storage region 121 stores by zone the zone setting data which indicates the setting contents of each zone.

FIG. 4 is a figure which shows an example of the content of zone setting data. As shown in the drawing, the zone setting data stores in mutual relation the respective items of "zone ID" and "zone name" and "input source" and "sound volume" and "tone control setting" and "acoustic setting" and "output terminal" and "zone On/Off state." Among these items, the "zone ID" item stores identification information which identifies the zone. The "zone name" item stores data which indicates the name of the zone, such as "living room" or "kitchen." The "input source" item stores data which indicates the type of input source selected when the power is on, such as "DVD" or "CD." The "sound volume" item stores data which indicates the sound volume which is set when the power is on. The "tone control setting" item stores data which indicates the adjustment values for adjusting the tone scale of images. The "acoustic setting" item stores data indicating the setting contents for various types of acoustic processing such as effect processing. The "output terminal" item stores identification information which indicates the output terminal assigned to the respective zone. The "zone on/off state" item stores data which indicates the on (output)/off (no output) state of the respective zone. This zone setting data may be modified by the user of the AV receiver 1 using the operation portion 14. The operation portion 14 outputs operational signals to the control portion 11 according to the content of manipulation. Based on the signals received from the operation portion 14, the control portion 11 stores the zone setting data in the zone setting data storage region 121. In this embodiment, the case is described where the four zones of main zone Z1, zone Z2, zone Z3 and zone Z4 are used (the case of the mode of use shown in FIG. 3), but the number of zones is not limited to this, and it is also acceptable to have a lesser or greater number of zones.

Returning to FIG. 1, the AV receiver 1 has digital input terminals 21, 22 and 23, as well as analog input terminals 24, 25, . . . 35. The digital input terminal 21 is an optical digital audio terminal into which digital audio signals are input, and the digital input terminal 22 is a coaxial digital audio terminal into which digital audio signals are input. The digital input terminal 23 is an HDMI (High-Definition Multimedia Interface) input terminal. The digital audio signals input into the digital input terminal 23 are supplied via an HDMI repeater 44 to a switch circuit 43 or main zone selector 45. The main zone selector 45 is a selection means which selects one of the signals input into the multiple digital input terminals 21, 22 and 23, and which treats it as a signal to the main zone (an input signal to a DSP (Digital Signal Processor) 47). An input terminal 38 receives audio signals via a communications network such as the internet, and is an input terminal for USB audio. A network I/F 41 supplies the audio signals input to the input terminal 38 to a network DAC (Digital to Analog Converter) 42 or switch circuit 43. The network DAC 42 is a converter which converts digital audio signals supplied from the network I/F 41 to analog audio signals.

The analog input terminal 24 is an input terminal into which analog audio signals supplied from a live microphone are input, and analog input terminals 25 to 35 are input terminals into which analog audio signals such as CD, CD-R, DVD, and MD/Tape are respectively input. A tuner 36 is a receiver which receives radio waves such as FM broadcasts or AM broadcasts, and a tuner 37 is a receiver which receives radio waves of HD-Radio. An input selector 54 selects from among audio signals supplied from the analog input terminals 24-35 and tuners 36-37 based on the zone setting data stored in the memory portion 12 when the power is turned on, and thereafter based on the manipulation of the operation portion 14, and supplies the selected analog audio signals to a switch circuit 50 or main zone ADC 57. The main zone ADC converts the analog audio signals supplied from the input selector 54 to digital audio signals, and supplies them to a DIR (Digital Interface Receiver) 46.

The DIR 46 supplies the audio signals supplied from the main zone selector 45 to the switch circuit 43, and supplies the digital audio signals supplied from the main zone ADC 57 to the switch circuit 43. The switch circuit 43 receives the digital audio signals supplied from the network I/F 41, HDMI repeater 44, and DIR 46. The switch circuit 43 identifies whether any of the supplied digital audio signals are allotted to the main zone by referencing the zone setting data stored in the memory portion 12, and supplies the identified digital audio signal to the DSP 47.

The DSP 47 is a digital audio signal processor which conducts sound field supplementation processing, various types of decoding processing, and various types of signal processing such as speaker adjustment and environmental correction. The DSP 47 performs sound field processing which imparts acoustic properties to input signals, and decoding processing which subjects input signals to a predetermined decoding. The DSP 47 conducts sound field processing based on sound field data actually measured in advance in a theater or concert hall, and conducts decoding processing such as Dolby digital or AAC. In this embodiment, the DSP 47 is configured to conduct sound field processing and decoding processing, but it is also acceptable to have it conduct one or the other type of processing. Moreover, the DSP 47 is not limited to these types of processing, and may, for example, be configured to conduct processing which imparts various types of acoustic effects.

The DSP 47 supplies the digital audio signals of N channels (N is a natural number of 2 or more) which have undergone signal processing to the main zone DAC 48. The channel number N is suitably set by manipulation of the operation portion 14, and is set to six in the case of this operational example (compatible with 5.1 channels). This DSP 47 is provided with a mixing function which conducts down-mixing of the digital audio signals of N channels to M channels (M<N; M is a natural number). The value of M in this case is suitably set by manipulation of the operation portion 14, and M is set to two in this operational example (compatible with 2 ch stereo). The digital audio signals which are down-mixed by the mixing function are converted to analog signals by a subzone DAC 49, and supplied to switch circuits 51, 52 and 53.

The main zone DAC 48 converts the digital audio signals supplied from the DSP 47 into analog audio signals, and supplies them to the switch circuit 50. The switch circuit 50 functions as a switching means for switching with respect to which output terminal is to receive the audio signals input to which input terminal. Based on the manipulation of the operation portion 14, the switch circuit 50 supplies either audio signals received from the main zone DAC 48 or audio signals received from the input selector 54 to a main zone volume adjustor 55. The main zone volume adjustor 55 adjusts the sound volume of the audio signals based on the manipulation of the operation portion 14, and outputs them to a switch circuit 56 or to the main zone pre-out terminals 82, 83, . . . 92.

By referencing the zone setting data stored in the memory portion 12, the zone selector 58 identifies whether zone Z2, zone Z3 or zone Z4 is to receive audio signals supplied from any of the input terminals among the analog input terminals 24-35 and tuners 36 and 37, and supplies the audio signals corresponding to the respective zones of the respective switch circuits 51, 52 and 53 to each switch circuit 51, 52 and 53.

The switch circuits 51, 52 and 53 are selection means for selecting and outputting from among the audio signals subjected to down-mixing processing (audio signals supplied from the subzone DAC 49) and other signals (audio signals from the network DAC 42 and audio signals from the zone selector 58). In this embodiment, as signals other than audio signals subjected to down-mixing processing, a configuration is adopted where two types of audio signals (audio signals from the network DAC 42 and audio signals from the zone selector 58) are input, but audio signals input as other signals are not limited to these two types, and it is acceptable to have more or fewer than these.

Each switch circuit 51, 52 and 53 is provided so as to respectively correspond to zone Z2, zone Z3 and zone Z4, and are jointly controlled by the control portion 11. In this embodiment, a configuration is adopted where three switch circuits (selection means) are provided, but the number of selection means is not limited thereto, and a configuration where they are provided by zone is acceptable. According to the zone setting data corresponding to zone 2 stored in the memory portion 12, the switch circuit 51 supplies whichever of the audio signals that are supplied by the network DAC 42, subzone DAC 49 and zone selector 58 to a zone 2 volume adjustor 59. Similar to switch circuit 51, switch circuits 52 and 53 also respectively supply whichever of the audio signals that are supplied by the network DAC 42, subzone DAC 49 and zone selector 58 to a zone 3 volume adjustor 60 and zone 4 volume adjustor 61 according to the zone setting data stored in the memory portion 12.

The zone 2 volume adjustor 59 adjusts the volume of the audio signals supplied from the switch circuit 51, and outputs them to the zone selector 62 or pre-out terminals 93, 94 or 95. Similar to the zone 2 volume adjustor 59, the zone 3 volume adjustor 60 and zone 4 volume adjustor 61 adjust the volume of the audio signals respectively supplied the switch circuit 52 and switch circuit 53, and outputs them to the zone selector 62 or pre-out terminals 93, 94, or 95. The zone selector 62 references the zone setting data stored in the memory portion 12, and outputs the audio signals respectively supplied by the zone 2 volume adjustor 59, zone 3 volume adjustor 60 and zone 4 volume adjustor 61 to the power amp corresponding to the respective zones among the power amps 631-641. The power amps 631-641 are connected to speakers, and the audio signals output by the power amps 631-641 are supplied to the speakers. The speakers emit sound at an intensity corresponding to the audio signals supplied by the power amps 631-641.

B: Operations

Next, the operations of this embodiment are described. In the following description, a description is given of (1) the case where the AV receiver 1 is used with 11.2 ch in the main zone Z1, i.e., the case where the 11 main amps are all used in the main zone Z1, (2) the case of use with 5.1 ch in the main zone Z1, and individual use is respectively made of 2ch stereos in the three rooms of zone Z2, zone Z3 and zone Z4, i.e., the case where 5 main amps are used in the main zone Z1, and 2 main amps are respectively used in zones Z2-Z4 (in this case, as well, the number of main amps employed totals 11). Particularly in the case of (2), the case is included where the identical input source flows in the four zones of the main zone Z1, zone Z2, zone Z3 and zone Z4, so that a description is given for each operational example of cases (1) to (3).

B-1: Operations for Use of Main Zone 11.2Ch

First, a description is given with reference to FIG. 2 of the example of operation in the case where the AV receiver is used with 11.2 ch in the main zone Z1. First, the user of the AV receiver 1 uses the operation portion 14 to conduct manipulation for the purpose of audio signal playback. The operation portion 14 outputs an operational signal corresponding to the content of the manipulation. Based on the signal supplied from the operation portion 14, the control portion 11 outputs the various types of audio signals input to the input terminals to each speaker installed in the main zone Z1. The output signals of the preamps from the terminals are directly supplied to the two subwoofers SW, and are amplified by the internal amp provided inside the enclosure of the subwoofer. By this means, surround-sound of 11.2 ch is achieved in the main zone Z1.

Here, as one example of these operations, a description is given of operations in the case where audio signals supplied from other equipment connected to digital input terminal 23 is played back. In this case, the zone setting data of the memory portion 12 is stored so as to correspond to “main zone” and “HDMI.” The digital audio signals input to digital input terminal 23 are supplied to the switch circuit 43 via the HDMI repeater 44. In the switch circuit 43, the audio signals supplied to the DSP 47 are switched based on the zone setting data stored in the memory portion 12. In this operational example, as correspondence is established between the digital input terminal 23 and the main zone, the switch circuit 43 supplies the audio signals supplied from digital input terminal 23 to the DSP 47. In accordance with the acoustic settings corresponding to the main zone Z1 contained in the zone setting data stored in the memory portion 12, the DSP 47 performs various types of acoustic processing such as sound field supplementation and imparting effects, and supplies the digital audio signals subjected to acoustic processing to the main zone DAC 48.

The main zone DAC 48 converts the digital audio signals supplied from the DSP 47 to analog audio signals, and supplies the converted analog audio signals to the switch circuit 50. Based on the zone setting data stored in the memory portion 12, the switch circuit 50 switches the audio signals supplied to the main zone volume adjustor 55. In this operational example, as zone setting data which establishes correspondence between the main zone Z1 and the digital input terminal 23 is stored in the zone setting data storage region 121, the switch circuit 50 supplies the audio signals input to digital input terminal 23—i.e., the audio signals supplied from the main zone DAC 48—to the main zone volume adjustor 55.

The main zone volume adjustor 55 adjusts the sound volume of the audio signals supplied from the switch circuit 50, and supplies them to the switch circuit 56. Based on the zone setting data stored in the memory portion 12, the switch circuit 56 outputs the audio signals to the power amps corresponding to the main zone. In this operational example, the eleven types of audio signal are respectively supplied to power amps 631, 632, . . . 641. Power amps 631, 632, . . . 641 respectively amplify the audio signals supplied from the switch circuit 56, and output the amplified audio signals to the speakers connected to the respective power amps. In this manner, sound is emitted from each speaker installed in the main zone Z1 at an intensity corresponding to the audio signals supplied to each speaker.

B-2: Individual Playback Operation by Zone

Next, a description is given below with reference to FIG. 3 of one example of operations in the case where individual sources are played back by zone. First, the user of the AV receiver 1 uses the operation portion 14 to conduct manipulation for the purpose of setting relations of correspondence between each zone and the output terminals. In the example shown in FIG. 4, the user conducts manipulation so as to assign output terminals 82 and 83 to zone Z2, assign output terminals 71 and 72 to zone Z3, and assign output terminals 80 and 81 to zone Z4. The operation portion 14 outputs operational signals corresponding to the contents of manipulation to the control portion 11. According to the signals supplied from the operation portion 14, the control portion 11 stores the zone setting data in the zone setting data storage region 121 of the memory portion 12. The user further manipulates the operation portion 14, conducting manipulation for the purpose of setting relations of correspondence between each zone and the input terminals. The operation portion 14 outputs operational signals corresponding to the contents of manipulation to the control portion 11. According to the signals supplied from the operation portion 14, the control portion 11 stores the zone setting data in the zone setting data storage region 121 of the memory portion 12. The user further manipulates the operation portion 14, conducting manipulation for the purpose of setting relations of correspondence between each zone and the input sources. The operation portion 14 outputs operational signals corresponding to the contents of manipulation to the control portion 11. Based on the signals supplied from the operation portion 14, the control portion 11 stores zone setting data indicating the relations of correspondence between the zones and the input sources in the zone setting data storage region 121.

Next, the user of the AV receiver 1 uses the operation portion 14 to conduct manipulation for the purpose of playing back the audio signals. The operation portion 14 outputs operational signals corresponding to the contents of manipulation, and the control portion 11 outputs the audio signals input to each type of input terminal to each speaker respectively installed in the main zone Z1, subzone Z2, subzone Z3 and subzone Z4 based on the signals supplied from the operation portion 14. Each speaker emits sound at an intensity corresponding to the supplied audio signals, whereby sound is emitted in each zone according to the respective individual input source. Specifically, for example, a DVD input source is emitted in main zone Z1, a CD input source is emitted in zone Z2, and a MD input source is emitted in room A, such that the input source corresponding to each zone is individually emitted in its respective zone.

B-3: Party Mode Operation

Next, a description is given of one example of operation for the case (hereinafter, "party mode") where the same input source is played back in the four zones of the main zone Z1, zone Z2, zone Z3 and zone Z4. With respect to the AV receiver 1 which conducts playback of individual input sources by zone in the above-described manner, there also may be cases where it is desired to play back the same source in multiple zones. Specifically, in cases where, for example, a home party or the like is conducted using multiple rooms, it would be ideal if it were possible to have the same BGM flow into multiple rooms, and to play music which is synchronous. In this operational example, with respect to the AV receiver 1 which conducts playback of individual input sources by zone, a description is given of an operational example for the case where the same source is played back in multiple zones.

First, the user of the AV receiver 1 uses the operation portion 14, and conducts manipulation for the purpose of selecting the party mode. The operation portion 14 outputs operational signals corresponding to the content of manipulation to the control portion 11, and the control portion 11 controls the DSP 47 and the switch circuits 51, 52, 53 and so on according to the signals supplied from the operation portion 14.

In the case where the party mode is selected, under the control of the control portion 11, the DSP 47 supplies the audio signals received from the switch circuit 43 to the main zone DAC 48, subjects the audio signals received from the switch circuit 43 (i.e., audio signals for main zone use) to down-mixing processing so that the number of channels matches the number of output terminals assigned to each zone, and respectively supplies the audio signals subjected to down-mixing processing to the switch circuits 51, 52 and 53. In addition, when it is supplied with the signal indicating that party mode has been selected, the control portion 11 causes the switch circuits 51, 52 and 53 to select the audio signals which are received from the subzone DAC 49 (i.e., the audio signals which have undergone down-mixing processing). Under the control of the control portion 11, the switch circuits 51, 52 and 53 select the audio signals supplied by the subzone DAC 49, and supply them to the volume adjustors 59, 60 and 61. That is, in the case where party mode is selected, the respective switch circuits 51, 52 and 53 select the main zone audio signals—i.e., the audio signals supplied by the subzone DAC 49—even when audio signals are being received from other circuits such as the network DAC 42 or zone selector 58, and respectively supplies them to the zone 2 volume adjustor 59, zone 3 volume adjustor 60, and zone 4 volume adjustor 61.

Whereupon, if, for example, zone Z3 is in the off (no output) state, the control portion 11 turns on the output to zone Z3. When the party mode has terminated, the control portion 11 turns off the output to zone Z3. In this manner, referencing the item of "zone on/off state" of the zone setting data stored in the zone setting data storage region 121, the control portion 11 determines by zone whether or not there are output signals to be output, and conducts on/off control of output to each zone. With respect to on/off control of output to each zone, specifically, for example, it is acceptable to have the switch circuits 51, 52 and 53 conduct on/off control of signal output. Also, for example, it is acceptable to conduct on/off control of signal output to the zone selector 62 or pre-out output terminals 93, 94 and 95 by respectively providing the zone 2 volume adjustor 59, zone 3 volume adjustor 60 and zone 4 volume adjustor 61 with a switch means for switching between output/no output. Also, for example, it is acceptable to have the zone 2 volume adjustor 59, zone 3 volume adjustor 60 and zone 4 volume adjustor 61 respectively set the volume to zero when output is turned off. Also, for example, it is acceptable to conduct on/off control of signal output to the power amps corresponding to each zone. Furthermore, for example, it is also acceptable to conduct on/off control of the power which is supplied to the power amps corresponding to each zone. In short, it is sufficient if on/off control of signal output is conducted by zone.

The zone 2 volume adjustor 59, zone 3 volume adjustor 60 and zone 4 volume adjustor 61 respectively adjust the volume of the supplied audio signals, and supply the audio signals whose volume has been adjusted to the zone selector 62. Each audio signal is supplied via the zone selector 62 to the switch circuit 56, and the switch circuit 56 outputs each audio signal to the power amp corresponding to the respective zone based on the zone setting data. By this means, the sound of the same source as the main zone Z1 is respectively emitted in zone Z2, zone Z3 and zone Z4.

Incidentally, when it is undertaken to supply as is the audio signals which are supplied to the speakers installed in the main zone to the speakers installed in the subzones, in the case where the number of speakers in the subzones is less than the number of speakers in the main zone, the risk exists that there will be a lack of channels, and that the emitted music or audio will sound unnatural. With respect to this point, in the present embodiment, the audio signals for the main zone are down-mixed by the DSP 47 to the extent of the number of output terminals assigned to each zone, thereby enabling prevention of a lack of channels and unnatural emissions.

Moreover, in this embodiment, as down-mixing processing is conducted by the main zone DSP with respect to audio signals for other zones, it is possible to concomitantly use the main zone DSP for the processing pertaining to other zones, and to achieve party mode with a simpler configuration. It is also acceptable to additionally apply sound field processing and equalizers to the subzones before or after down-mixing.

Thus, according to this embodiment, not only is it possible to offer individual sources to multiple zones, but one can also output the same source to these multiple zones.

C: Modified Example

An embodiment was described above. However, the present invention is not limited to the above-described embodiment, and may be implemented in various other modes. Examples thereof are shown below. Each of the following modes may be appropriately combined.

(1) In the above-described embodiment, the AV receiver 1 is configured to be provided both with the power amps 631, 632, . . . 641 and the pre-out terminals 82, 83, . . . 95, but one is not limited thereto, and it is also acceptable to have a configuration which is provided only with pre-out terminals, or to have a configuration which is provided only with power amps.

(2) In the above-described embodiment, when party mode is selected, a configuration is adopted where the same source as the main zone is employed in all of the zones of zone Z2, zone Z3 and zone Z4. Instead of this, it is also acceptable to set by zone whether or not the same source as the main zone will be employed in party mode. In this case, the user uses the operation portion 14 to set which zone belongs to party mode, and based on the signals from the operation portion 14, the control portion 11 causes the setting data which indicates which zone belongs to party mode to be stored in the predetermined storage region of the memory portion 12. In this case, when party mode is selected, based on the setting data stored in the memory portion 12, the AV receiver 1 outputs audio signals of the same source as the main zone which have been down-mixed to the output terminals corresponding to the zones belonging to party mode, and respectively reproduces individual sources relative to other zones even during party mode. By this means, when settings are established where, for example, zone Z3 and zone Z4 belong to party mode, sound of the same source as the main zone is emitted from the speakers installed in zone Z3 and zone Z4 during party mode, while an individual source different from the main zone is reproduced in zone Z2.

It is also acceptable to adopt a configuration where, during party mode, switching occurs by zone as to whether or not the same input source as the main zone is to be reproduced. In this case, it is sufficient if, under the control of the control portion 11, the switch circuits 51, 52 and 53 corresponding to each zone switch the selected audio signals according to the operational signals from the operation portion 14.

In the above-described embodiment, when party mode is selected, it is acceptable to conduct control so that the control portion 11 of the AV receiver 1 turns on the power of the power amps corresponding to the subzones. In addition to this, when party mode is selected, it is also acceptable to have the volume adjustors corresponding to each zone adjust the volume of the respective zones according to the volume of the main zone. When image output is assigned to the respective zones, it is acceptable to switch the image output of the respective zones so that the image output of the main zone becomes the image output of the respective zones.

Preferred embodiments of the present invention have been described above, but the present invention is not limited by these embodiments. Additions, omissions, substitutions, and other modifications can be made within a scope which does not depart from the intent of the present invention. Accordingly, the present invention is not to be considered as being limited by the foregoing description, and is only limited by the scope of the appended claims.

What is claimed is:

1. An audio signal output apparatus comprising:

a signal processing unit which conducts a predetermined operation on input signals, and which outputs output signals of N channels;

a plurality of output terminals for a main zone outputting the output signals of N channels;

a mixing unit which generates output signals of M channels (M<N) by down-mixing the output signals of N channels;

a selection unit which selects and outputs either output signals of M channels output from said mixing unit or other input signals;

output terminals for subzones outputting the output signals selected by said selection unit;

a memory unit storing setting data that indicates a correspondence relationship between said other input signals and the output terminals for subzones; and a control unit which controls said selection unit to select output signals of said mixing unit in response to first and second command signals, wherein in response to the first command signal, said control unit is operable to cause the down-mixed output signals of M channels to be output from the output terminals for the subzones while simultaneously the signals of N channels are output from the output terminals for the main zone, in response to the second command signal, said control unit is operable to cause said other input signals to be output from the output terminals for the subzones based on the setting data, and the setting data further includes data that defines, on a subzone-by-subzone basis, whether or not a source for the main zone is applied to the selection unit in response to the first command signal.

2. The audio signal output apparatus according to claim 1, wherein said selection unit is plural and integrally controlled by said control unit.

3. The audio signal output apparatus according to claim 2, further comprising a mode determination unit which determines whether or not a predetermined mode is selected with regard to each of said selection units, wherein said control unit controls the selection unit to select the output signals of said mixing unit when said mode determination unit determines that said predetermined mode is selected with regard to the selection unit, and said control unit controls the selection unit to select an output signal other than the output signals of said mixing unit when said mode determination unit does not determine that said predetermined mode is selected with regard to the selection unit.

4. The audio signal output apparatus according to claim 1 further comprising a source selection unit which selects one signal among a plurality of signals output from a plurality of sources and determines the selected signal as the input signal of said signal processing unit.

5. The audio signal output apparatus according to claim 1 further comprising a source selection unit which selects one signal among a plurality of signals output from a plurality of sources and which determines the selected signal as the input signal of said mixing unit.

6. The audio signal output apparatus according to claim 1, wherein the predetermined operation conducted by said signal processing unit includes at least one of a sound field operation which appends sound field properties to the input signals and a decoding operation which decodes the input signals by applying a predetermined decoding method.

7. The audio signal output apparatus according to claim 1, further comprising a post-signal processing unit which conducts a sound field operation that appends sound field properties to the output signals of said mixing unit wherein said selection unit selects and outputs either among the output signals of said post-signal processing unit or other input signals.

8. The audio signal output apparatus according to claim 1 wherein said selection unit is plural, and the audio signal output apparatus further comprises:

a determination unit which determines whether or not the output signals to be output by each selection unit exist or not based on signals input from a manipulation unit; and a subzone output on/off control unit which conducts an on/off control of an outputting operation to subzones corresponding to each of said selection unit based on determination results of said determination unit.

9. An audio signal output apparatus comprising:

a signal processing unit which conducts a predetermined operation on input signals, and which outputs output signals of N channels;

a main zone amp which amplifies the output signals of N channels output from said signal processing unit;

a mixing unit which down-mixes the output signals of N channels to M channels (M<N);

a selection unit which selects and outputs either output signals of said mixing unit or other input signals;

a subzone amp which amplifies the output signals of said selection unit;

a memory unit storing setting data that indicates a correspondence relationship between said other input signals and the subzone amp; and a control unit which controls said selection unit to select output signals of said mixing unit in response to first and second command signals, wherein in response to the first command signal, said control unit is operable to cause the subzone amp to output the down-mixed output signals of M channels while simultaneously the main zone amp outputs the output signals of N channels, in response to the second command signal, said control unit is operable to cause the subzone amp to output said other input signals based on the setting data, and the setting data further includes data that defines, on a subzone-by-subzone basis, whether or not a source for the main zone is applied to the selection unit in response to the first command signal.

* * * * *